2,875,127

FUMIGATION WITH SULFURYL FLUORIDE

Eugene E. Kenaga, Midland, Mich., assignor to The Dow Chemical Company, Midland, Mich., a corporation of Delaware No Drawing. Application March 7, 1955
Serial No. 492,789

5 Claims. (Cl. 167—39)

The present invention relates to fumigation and is particularly concerned with an improved method and composition for the control of undesirable organisms and particularly in grain and its milled products.

The application of fumigant materials offers an excellent method for the control of insects, bacteria, and fungi in grain and its milled products. However, the utilization of such a method has been severely limited by the inability of many fumigant materials to penetrate in lethal concentrations to any substantial depth in grain and flour. The use of others of the known fumigant materials has been generally hampered by the disagreeable odor and flavor characteristics which they impart to matter fumigated. Thus, the hazard of off-flavor and ill-smelling grain has curtailed widespread employment of many such materials. These shortcomings of known treatment methods have created special difficulties in the fumigation of grain and its milled products.

It is an object of the present invention to provide a new and improved method of fumigation for the control of nematodes, bacteria, molds and insects. It is a further object to provide a method and composition for the fumigation of grain and its milled products. Another object is the provision of a method and composition which will accomplish superior penetration of grain and its milled products. An additional object is the provision of a method which does not impart an off-taste or offensive odor to fumigated materials or adversely affect the viability of grain. Other objects will become apparent from the following specification and claims.

According to the present invention it has been discovered that matter infested or infected with bacteria, molds, round worms, nematodes and insects advantageously may be fumigated and the organisms controlled by treatment with sulfuryl fluoride. More particularly, it has been discovered that grain and its milled products and other foodstuffs may be fumigated with or exposed to the vapors of this fluoride compound to control mold organisms and insects without imparting undesirable taste or odor characteristics to the fumigated product. Such fumigation operations are carried out in an enclosed space or otherwise to insure a sufficient period of contact of the fumigant with the infesting organisms.

Sulfuryl fluoride is a non-flammable, non-corrosive gaseous material which boils at about −52° C. at 760 millimeters pressure. This desirable vapor pressure property allows the compound to serve as its own propellent and particularly in compositions in which it is employed. Further, the compound is somewhat soluble in many organic solvents and has a very low solubility in water at room temperature. It is adapted to be easily and conveniently employed for the fumigation of grain and its milled products. The compound has very desirable penetrating properties which enable its vapors to diffuse through and permeate in lethal concentration the interstices of grain and its milled products within a relatively short period of time and to a depth much greater than is the case with many known fumigant materials.

The exposure of the infesting organisms to at least a minimum effective dosage of the compound is essential for the practice of the present invention. In general, this dosage is employed in an enclosed space and amounts to a lethal or parasiticidal concentration. When fumigating grain and its milled products, good results generally are obtained when the fluoride compound is employed in the amount of about 0.25 pound per thousand cubic feet of space within which the product is enclosed. Under optimum conditions satisfactory controls may be obtained with as little as 0.1 pound per 1000 cubic feet.

In carrying out the present invention, the matter to be fumigated may be exposed to the vapors of the sulfuryl fluoride in any convenient manner. When fumigating grain, the grain is placed in an enclosure together with the required amount of the compound. In such operations, the compound may be introduced generally into the enclosure or at various levels within the stored grain. In the fumigation of flour and milled grain products, the latter are generally bagged and thereafter placed in an enclosure together with the required amount of sulfuryl fluoride. The exposure of the infested material and undesirable organisms may be carried out in some other gas than air, e. g. nitrogen or carbon dioxide.

In an alternative method, the fluoride compound is dissolved or otherwise incorporated in a fumigant adjuvant, e. g. a volatile organic solvent diluent such as acetone, or volatile liquid halo-aliphatic compound, or volatile petroleum distillate, and the resulting mixtures employed in the manner as previously described. These compositions are self-propellent and may be prepared by mixing liquefied sulfuryl fluoride with the solvent diluent in a sealed container or cylinder. Such compositions are particularly useful in the line fumigation of packaged products where the fumigant material is introduced directly into the package. The preferred organic solvent carriers are those of such volatility that they evaporate from the matter treated and leave little permanent residue therein. The exact concentration of the fluoride compound to be employed in these solvent compositions is not critical. The required dosage of the fluoride compound generally may be supplied with compositions containing from about 1 to 90 percent by weight of toxicant.

Other materials which may be combined with the sulfuryl fluoride, either as volatile solvents or as supplementary toxicants or both, include ethylene bromide, carbon tetrachloride, ethylene chloride, propylene oxide, isopropyl formate, hydrogen cyanide, trichlorobromomethane, acrylonitrile, carbon bisulfide, trichloroethylene, tetrachloroethylene, propylene chloride, methyl bromide, benzene hexachloride, chloropicrin, pyrethrum, ryania and $\beta,\beta'$-dichloro ethyl ether. These compositions may be prepared by mixing liquified sulfuryl fluoride with the supplementary material in a sealed container and are of outstanding value for the fumigation of infested material where superior penetrating properties are desired. Alternatively, such compositions may be similarly dissolved or otherwise incorporated in an inert organic solvent and the latter compositions employed in the present method as previously described.

According to the present invention, grain and its milled products are generally exposed to the vapors for a period of at least 2 hours or longer, the exact period of time being dependent upon the nature and size of the treating chamber and the ease with which the vapors may penetrate the product to be fumigated, e. g., whether grain or flour is concerned. In smaller enclosures, exposures from a few minutes to a few hours may be sufficient to accomplish penetration and the killing of the organisms. In large enclosures and with large quantities of grain and its milled products, periods up to 72 hours or longer may be desirable.

The following examples illustrate the invention but are not to be constructed as limiting:

*Example 1*

Sulfuryl fluoride was employed for the fumigation of an enclosure, the inner walls and surfaces of which were infested with adult confused flour beetles (*Tribolium confusum*). In such operations, the compound was introduced into the enclosure from a pressure container in an amount sufficient to provide a concentration of 0.25 pound of toxicant vapors per 1000 cubic feet of space. The interior surfaces of the enclosure and its infesting organisms were thereafter exposed to the vapors for a period of 16 hours and at a temperature of about 80° F. As a result of these operations, there was obtained a 100 percent kill of the infesting organism.

*Example 2*

In a similar operation, sulfuryl fluoride was employed for the control of black carpet beetle larvae (*Attagenus piceus*). As a result of such operations, a 100 percent kill of the beetles was obtained with a concentration of 0.25 pound of toxicant per 1000 cubic feet of space.

*Example 3*

Sulfuryl fluoride was also employed as described in Example 1 for the control of granary weevil (*Sitophilus granarius*). In such operations, a 100 percent control of the weevil was obtained with a concentration of 0.25 pound of toxicant per 1000 cubic feet of space.

*Example 4*

Sulfuryl fluoride was also employed for the fumigation of corn, wheat, milo and oats. In these operations, one of the above cereal grains, infested with black carpet beetle larvae and confused flour beetle adults, was placed in a fumigant chamber and sulfuryl fluoride compound introduced into the chamber in an amount sufficient to provide a concentration of 3 pounds per 1000 cubic feet of space. In the fumigation operations, each of the cereal grains was exposed to the vapors of the toxicant compound for a period of 16 hours. As a result of these operations, there was obtained a 100 percent control of the infesting organisms in each of the fumigated grains. Following the fumigation operations, the grain was aerated for one week. At the end of this period, no off-taste or offensive odor attributable to the action of the sulfuryl fluoride was found in the fumigated grain. Tests were also carried out in which the fumigated grain and unfumigated grain were planted to ascertain whether or not the treatments had affected germination. The determinations showed that the fumigation operations had not adversely affected the viability of the corn, wheat, milo or oats.

*Example 5*

Liquefied sulfuryl fluoride is mixed with acetone in a cylinder to prepare a self-propellent fumigant composition containing 85 percent by weight of toxicant. This composition is introduced into an airtight bin of oats which is infested with adult confused flour beetle and black carpet beetle pupae. The amount of fumigant composition employed is sufficient to provide a concentration of 2 pounds of the vapors of the sulfuryl fluoride per 1000 cubic feet of space. The oats are stored in the bin to a depth of 6 feet. After 3 days' exposure at an average temperature of about 75° C., a complete kill of the infesting insects is observed at all levels in the grain. The fumigated grain is thereafter aerated for 2 weeks. At the end of this period the treated grain is not characterized by any off-taste or offensive odor attributable to the action of the fluoride compound.

*Example 6*

Sulfuryl fluoride was also employed for the fumigation of wheat flour. In such operations flour infested with adult confused flour beetle and black carpet beetle larvae was placed in a fumigant chamber and the fluoride compound introduced into the chamber in an amount sufficient to provide a concentration of 0.25 pound per 1000 cubic feet. In the fumigation operations, the flour was exposed to the vapors of the toxicant for about 16 hours. As a result of this exposure, there was obtained a 100 percent kill of the infesting organisms to a depth of 10 inches in the finely milled product. The flour was then aerated. Sensory examination and inspection of the flour, one week following the exposure, indicated no evidence of off-taste or offensive odor attributable to the action of the sulfuryl fluoride compound.

*Example 7*

Corn infested with the larvae and pupae of granary weevils and Angoumois grain moth (*Sitotroga cerealella*) was fumigated with sulfuryl fluoride by exposing the corn in a fumigant chamber to the vapors of the toxicant at a dosage of 0.25 pound per 1000 cubic feet of space. In the fumigation operations, the corn was exposed to the vapors of the toxicant compound for a period of 16 hours. As a result of these operations, there was obtained a 100 percent kill of the larvae and pupae of both insect species.

*Example 8*

In a similar operation, equine feces heavily infested with equine strongyles larvae was fumigated with sulfuryl fluoride by exposing the infested material in a fumigant chamber to the vapors of the toxicant at a dosage of 3 pounds per 1000 cubic feet of space. In the fumigation, the exposure to the vapors of the toxicant compound was carried out over a period of 16 hours. As a result of these operations, there was obtained a 100 percent kill of equine strongyles larvae.

*Example 9*

Sulfuryl fluoride is employed for the line fumigation of dried prunes packaged in sealed bags of saran (polyvinylidene chloride) film. In such operations, the fluoride compound is dispersed from a pressure container equipped with a metering valve discharging a measured portion of the toxicant through a needle orifice into each packaged food container. The amount of the fluoride compound introduced into each food container is sufficient to provide in each package a concentration of 3.0 pounds of toxicant per 1000 cubic feet. Following the introduction of the fumigant, the discharge needle is withdrawn from the bag and the perforation therein sealed. The fumigated prunes and unfumigated but similarly packaged prunes are then stored at an average temperature of about 75° F. After one month of storage, various of the fumigated and unfumigated packages are selected at random and examined for the development of mold and mildew on the packaged contents. The examination shows a commercial control of mildew and mold on the fumigated prunes with many of the unfumigated and packaged prunes showing a heavy growth of these organisms.

*Example 10*

Sulfuryl fluoride was employed for the fumigation of an enclosure, the interior surface and walls of which were infested with termites. In such operation, the compound was introduced into the enclosure from a pressure container in an amount sufficient to provide a concentration of 0.12 pound of toxicant vapor per 1000 cubic feet of space. The interior surface of the enclosure and its infesting organisms were thereafter exposed to the vapors for a period of 16 hours and at a temperature of about 75° F. As a result of this operation, there was obtained a 96 percent kill of termites.

I claim:

1. A method for controlling insects, molds and nematodes which includes the step of exposing matter infested with these organisms to the vapors of sulfuryl fluoride, the exposure being carried out in an enclosed space and with an amount of sulfuryl fluoride sufficient to provide a concentration of at least 0.1 pound per 100 cubic feet of enclosed space.

2. A method which comprises exposing matter infested with insects to the vapors of sulfuryl fluoride, the exposure being carried out in an enclosed space and with an amount of sulfuryl fluoride sufficient to provide a concentration of at least 0.1 pound per 1000 cubic feet of enclosed space.

3. A method which comprises the step of fumigating grain and its milled products with sulfuryl fluoride in the minimum proportion of at least 0.1 pound of sulfuryl fluoride per 1000 cubic feet of space to be fumigated.

4. A method which comprises the step of exposing grain and its milled products to the vapors of sulfuryl fluoride, the exposure being carried out in an enclosed space and with an amount of sulfuryl fluoride sufficient to provide a concentration of at least 0.25 pound per 1000 cubic feet of enclosed space.

5. A method which comprises treating grain and its milled products with a composition including sulfuryl fluoride as an active toxic ingredient in intimate admixture with a fumigant adjuvant as a carrier therefor, the treatment being carried out in an enclosed space at a dosage of at least 0.25 pound of the fluoride compound per 1000 cubic feet of said space.

References Cited in the file of this patent

UNITED STATES PATENTS 2,114,577  Schrader _____ Apr. 19, 1938

OTHER REFERENCES

Merck Index for 1952, p. 926.

Handbook of Chem. and Physics, 26th ed., 1942, pp. 466, 467, pub. by Chem. Rubber Publ. Co., Cleveland, Ohio.

U. S. Dept. of Agri. Bull., No. 1313, January 26, 1925, p. 11.

Pamphlet entitled "Chem. Warfare Agents for the Eradication of Pests," publ. November 15, 1927, pp. 1–4.

UNITED STATES PATENT OFFICE
CERTIFICATE OF CORRECTION

February 24, 1959

Patent No. 2,875,127

Eugene E. Kenaga

It is hereby certified that error appears in the printed specification of the above numbered patent requiring correction and that the said Letters Patent should read as corrected below.

Column 5, line 3, for "100 cubic feet" read -- 1000 cubic feet --.

Signed and sealed this 14th day of July 1959.

(SEAL)
Attest:

KARL H. AXLINE
Attesting Officer

ROBERT C. WATSON
Commissioner of Patents